United States Patent [19]

Winter

[11] 4,261,819
[45] Apr. 14, 1981

[54] RECOVERY OF HEAVY METALS FROM SOLUTION BY CONTACTING WITH CROSS-LINKED CASEIN

[75] Inventor: George Winter, Beaumaris, Australia

[73] Assignee: Commonwealth Scientific and Industrial Research Organization, Melbourne, Australia

[21] Appl. No.: 84,614

[22] Filed: Oct. 15, 1979

[51] Int. Cl.³ .............................................. C08L 89/02
[52] U.S. Cl. ..................................... 210/688; 260/6; 521/30
[58] Field of Search ........................................... 260/6

[56] References Cited

U.S. PATENT DOCUMENTS

| 3,408,291 | 10/1968 | Thomas et al. | 210/38 B |
| 3,925,192 | 12/1975 | Randall et al. | 210/38 B |
| 3,944,415 | 3/1976 | Randall et al. | 210/38 B |
| 3,957,698 | 5/1976 | Hatch | 210/38 R |
| 3,979,286 | 9/1976 | Wing et al. | 210/38 B |

FOREIGN PATENT DOCUMENTS 49-10183  1/1974  Japan ..................................... 210/38 B

OTHER PUBLICATIONS

Chem. Absts. 72 (1970) 79890h, Chlorinated Ion-Exchange Resins, Elec. Red. Co.

Primary Examiner—Edward M. Woodberry

[57] ABSTRACT

A method of abstracting heavy metal ions from solution in which a solution containing heavy metal ions is brought into contact with a cross-linked casein which is optionally thiolated.

4 Claims, 2 Drawing Figures

RESIDUAL $Zn^{2+}$ CONCENTRATION AFTER EQUILIBRATION
——THIOLATED CROSS-LINKED CASEIN,
— — CROSS-LINKED CASEIN
— — — CALCULATED FOR HYDROXIDE PRECIPITATION

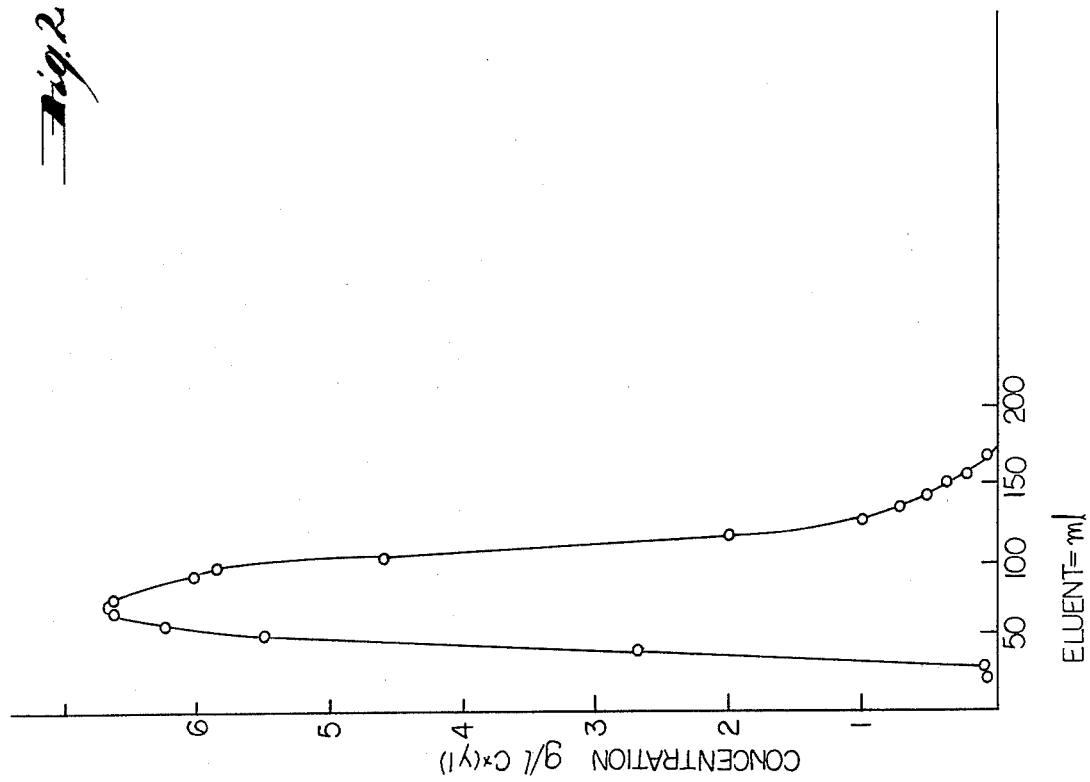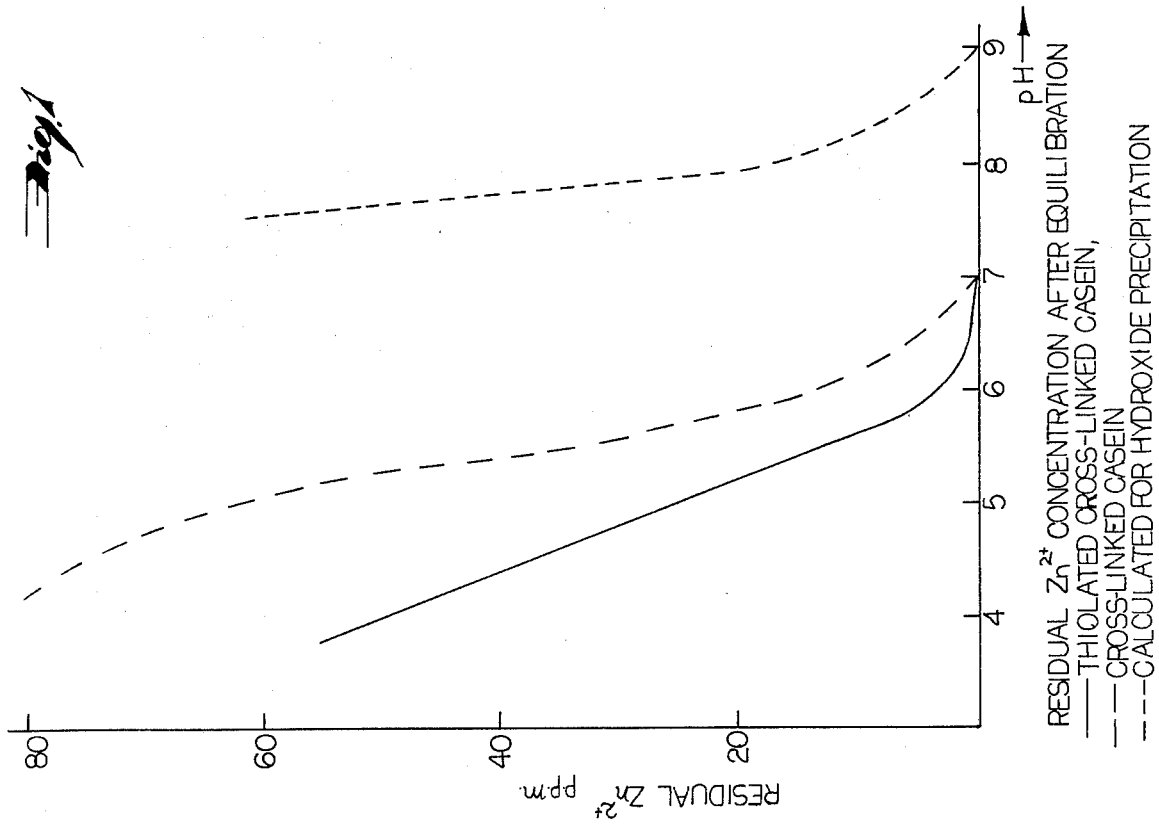

RECOVERY OF HEAVY METALS FROM SOLUTION BY CONTACTING WITH CROSS-LINKED CASEIN

This invention relates to ion-exchange materials for the recovery of heavy metals from solution and to methods of heavy metal recovery based on the uses of such materials. The invention is also concerned with separating a mixture of heavy metal ions in solution.

In the recovery of metals from solutions, it is known to use ion exchange materials of both synthetic and natural origin. Ion exchange materials derived from natural products are a commercially attractive possibility and a number of materials based essentially on carbohydrates have been examined. Of these, xanthates of starch and cellulose in particular have been proposed for the removal of metal ions from waste liquors. Natural proteins in living organisms are also known to be able to abstract heavy metal ions from dilute solutions.

The present invention is concerned with the use of modified proteins, in particular casein, for the purification of waste waters by abstraction of heavy metal values therefrom. Casein is a commercially available and relatively inexpensive protein. Chemically, it may be regarded as a polyfunctional ion exchanger in which phosphoric, carboxylic, phenoxy and amino groups are the main active groups.

Casein however is soluble in water above pH 7 and in order to obtain an insoluble material, some cross-linking of the casein is necessary. Cross-linking of casein is a well-known procedure and may be carried out, for example, by treatment with an aldehyde to provide an insoluble product suitable for use as an ion exchange material for abstraction of metal values from solutions. A preferred method of cross-linking casein comprises the use of formaldehyde as a cross-linking agent.

We have found that such cross-linked casein is capable of selectively removing heavy metal ions from solution. The selectivity of cross-linked casein for heavy metal ions may be increased by thiolation, i.e. the introduction of thiol groups into the cross-linked material.

According to one aspect of the present invention there is provided a method of abstracting heavy metal ions from solution in which a solution containing heavy metal ions is brought into contact with a cross-linked casein.

According to another aspect of the invention there is provided a method of abstracting heavy metal ions from solution whereby a solution containing heavy metal ions is brought into contact with a thiolated, cross-linked casein.

According to yet a further aspect of the invention there is provided a method of separating a mixture of heavy metal ions whereby a solution containing at least two heavy metal ions is brought into contact with a cross-linked casein or a thiolated cross-linked casein under conditions such that one of said heavy metal ions is selectively adsorbed onto said cross-linked casein or thiolated, cross-linked casein.

Preferably the solution is brought into contact with the cross-linked casein or thiolated, cross-linked casein at a predetermined pH.

Selective adsorption of heavy metal ions from solution is dependent on the pH of the solution.

The invention also provides ion exchange materials, comprising cross-linked casein or thiolated, cross-linked casein and method of preparing same.

In this description, reference is made to the accompanying figures wherein:

FIG. 1 is a plot showing the variation in the concentration of residual zinc ions as a function of a changing pH (discussed in more detail in Example 4); and FIG. 2 is a plot showing the variation in the concentration of chromium (VI) with respect to the volume of eluent (discussed in more detail in Example 10).

The invention is further described and illustrated by the following non-limiting examples which set out preferred methods of preparing cross-linked and thiolated, cross-linked casein and show their use as ion exchangers for abstraction of heavy metal ions from solution or selective separation of a mixture of heavy metal ions in solution.

EXAMPLE 1—Preparation of Cross-Linked Casein 100 gm of casein hydrochloride in the form of a coarse grained powder was mixed with 400 ml of water. To this mixture was added 9 gm of 30% aqueous formaldehyde solution. The resultant mixture was allowed to stand for two days and was then washed with water. Cross-linked casein was obtained as an insoluble, powdery product.

To convert the cross-linked casein into its potassium form it was treated with an excess of a 25% aqueous solution of KOH. The product was then washed with water until the pH of the washings fell to 12.5.

EXAMPLE 2—Alternative Procedure for Cross-Linking of Casein

A slurry of 100 gm of casein hydrochloride in water was placed into a glass tube. Water containing 3 gm of formaldehyde was circulated through the casein bed for 24 hours and then washed with water. The resulting adsorption column was adjusted to the required pH by treating with acid or alkali.

EXAMPLE 3—Thiolation of Cross-Linked Casein

The cross-linked product, prepared as in Example 1, was treated with excess $CS_2$ with stirring for 24 hrs. The pale yellow powder obtained after filtration was washed with water until the pH of the washings fell to 11, then washed with alcohol and dried.

The sulfur content of the original material was found to have increased from 0.7% before thiolation to 2.3% and on shelf storage for six months, no decomposition was detected. Although the exact nature of the sulfur containing groups has not yet been established, the relative stability of the thiolated product and the position of a characteristic infrared absorption band at 980 $cm^{-1}$ suggest that thiols other than xanthates are involved.

EXAMPLE 4—Adsorption of Zinc 2 gm portions of cross-linked casein (in both thiolated and non-thiolated form) were suspended in 400 ml aliquots of $1.3 \times 10^{-3}$ M $ZnSO_4$ solution at various pH values. After equilibration the casein was separated from the solutions which were analyzed for residual zinc. The results are shown in FIG. 1, together with the calculated values expected for zinc hydroxide precipitation shown for comparison.

EXAMPLE 5—Adsorption of Cobalt

A solution of 3 gm of $CoSO_4.7H_2O$ in 100 ml of water, adjusted to pH 7 with ammonium hydroxide was stirred with 2 gm cross-linked casein for 4 hrs. The casein was separated from the solution and eluted with 0.1 M $H_2SO_4$, resulting in a recovery of 62.7 mg of $Co^{2+}$.

EXAMPLE 6—Adsorption of Lead

A solution of 3 gm $Pb(No_3)_2$, adjusted to pH 5 with potassium hydroxide was stirred with 2 gm of cross-linked casein for 4 hrs. The casein was separated from the solution and eluted with 0.1 M HCl, resulting in a recovery of 276 mg $Pb^{2+}$.

EXAMPLE 7—Separation of Copper from Iron 100 ml of a solution containing 89 mg $Cu^{2+}$ and 42 mg of $Fe^{2+}$ as sulfates were treated with 5 gm cross-linked casein at pH 2.2 for 4 hrs. The cross-linked casein was separated by settling and decanting the solution. On eluting the cross-linked casein with 3.5 N sulfuric acid 5.9 mg $Cu^{2+}$ and 34.6 mg $Fe^{3+}$ were recovered. The solution was treated with a further 5 gm of cross-linked casein at pH 4.5 for four hours and then found to contain 29.9 mg $Cu^{2+}$ and 0.41 mg $Fe^{3+}$. On elution of the cross-linked casein with 1 N $NH_4Cl$ a solution containing 34.6 mg $Cu^{2+}$ and 0.01 mg $Fe^{3+}$ was obtained.

EXAMPLE 8—Column Separation of Copper from Iron

Compared with the results obtained in Example 4, a similarly effective separation was achieved by passing the same starting solution of $Cu^{2+}$ and $Fe^{3+}$, adjusted to pH 2.5, through a column packed with cross-linked casein.

EXAMPLE 9—Adsorption of Chromate Anions 50 ml of a solution containing 113 mg of chromium (VI) in the form of $Cr_2O_7^{2-}$ anions was stirred with 5 gm of cross-linked casein at pH 2.5 for 4 hours. The cross-linked casein was separated by settling and decantation and then eluted with KOH solution at pH 9.2 upon which 75 mg of Cr (VI) was recovered in the eluate.

EXAMPLE 10—Removal and Recovery of Chromate by Column Adsorption

Preparation of Columns: Into each of two 50 mm ×750 mm glass tubes, connected by flexible tubing, was poured an aqueous slurry containing 150 gm of casein hydrochloride. Four liters of water containing 9 gm formaldehyde was then circulated through the columns for 24 hours. The column was then washed with 4 liters of water and the pH was then adjusted to 2.3 by circulating 2 liters of water containing 35 ml of 5 N $H_2SO_4$.

Adsorption of Chromate: 15.5 liters of a solution containing 800 ppm of Cr (VI) (prepared by dissolving the appropriate amount of $CrO_3$ in water) was passed through the columns at a rate of 8.5 liters per hour.

Elution of Chromate: The two columns were separated and the first column was eluted by the addition of 1.2 liters of 0.5 normal ammonia solution. The eluant was collected in 100 ml fractions. The variation in concentration of Cr(VI) is plotted in FIG. 2. 93% of the adsorbed chromium was contained in 1 liter (approx. 1 bed volume) of eluant at an average concentration of 4.64 gm Cr (VI) per liter.

The above examples show the ability of the ion-exchange materials of the invention to adsorb both cationic and anionic metal species from solution.

The removal of zinc from solution by cross-linked casein is clearly an adsorption process and is considered to involve ion exchange. From tests carried out to date, results comparable to those obtained with zinc have been obtained for the adsorption of other heavy metals such as Hg, Cr(III), Cd and Ni on both the thiolated and non-thiolated, cross-linked casein.

It is accordingly to be understood that the invention is in no way limited to processes described and exemplified herein and that many variations will fall within the spirit and scope of the invention which includes every novel feature and combination of novel features herein disclosed.

I claim:

1. A method of abstracting heavy metal ions from solution in which a solution containing heavy metal ions is brought into contact with a cross-linked casein.

2. A method according to claim 1 wherein the casein is cross-linked with formaldehyde.

3. A method for separating a mixture of heavy metal ions whereby a solution containing at least two heavy metal ions is brought into contact with a cross-linked casein under conditions such that one of said heavy metal ions is selectively adsorbed onto said cross-linked casein.

4. A method according to claim 1 or claim 2 or claim 3 wherein said cross-linked casein is thiolated.

* * * * *